United States Patent [19]
Linville, Jr. et al.

[11] Patent Number: 5,237,538
[45] Date of Patent: Aug. 17, 1993

[54] METHOD FOR REMOVING COHERENT NOISE FROM AN ARRAY OF SEISMIC TRACES

[75] Inventors: Andrew F. Linville, Jr., Dallas; Robert A. Meek, Sanger, both of Tex.

[73] Assignee: Mobil Oil Corporation, Fairfax, Va.

[21] Appl. No.: 838,178

[22] Filed: Feb. 20, 1992

[51] Int. Cl.$^5$ .............................................. G01V 1/00
[52] U.S. Cl. ........................................ 367/38; 367/43; 367/46; 367/52
[58] Field of Search ..................... 367/37, 38, 43, 50, 367/51, 52, 46

[56] References Cited
U.S. PATENT DOCUMENTS

| | | | |
|---|---|---|---|
| 4,218,765 | 8/1980 | Kinkade | 367/45 |
| 4,380,059 | 4/1983 | Ruehle | 367/46 |
| 4,853,903 | 8/1989 | Linville et al. | 367/46 |
| 4,972,382 | 11/1990 | Crider | 367/43 |
| 5,051,963 | 9/1991 | Linville et al. | 367/46 |
| 5,060,202 | 10/1991 | Meek et al. | 367/45 |
| 5,067,112 | 11/1991 | Meek et al. | 367/43 |

Primary Examiner—J. Woodrow Eldred
Attorney, Agent, or Firm—Alexander J. McKillop; Charles J. Speciale; George W. Hager, Jr.

[57] ABSTRACT

A space time gate is selected surrounding a coherent noise to be removed from an array of seismic traces. Signal-plus-noise within the selected gate is extracted from the array of seismic traces. Coherent noise within the gated signal-plus-noise is estimated and subtracted from such gated signal-plus-noise to provide a signal estimate. This signal estimate is restored into the array of seismic traces.

13 Claims, 4 Drawing Sheets

METHOD FOR REMOVING COHERENT NOISE FROM AN ARRAY OF SEISMIC TRACES

BACKGROUND OF THE INVENTION

In seismic exploration, it is common practice to deploy a large array of geophones on the surface of the earth and to record the vibrations of the earth at each geophone location to obtain a collection of seismic traces. The traces are sampled and recorded for further processing. When the vibrations so recorded are caused by a seismic source activated at a 10 known time and location, the recorded data can be processed by a computer in known ways to produce an image of the subsurface. The image thus presence of valuable hydrocarbons.

Seismograms are commonly recorded as digital samples representing the amplitude of received seismic signal as a function of time. Since seismograms are usually obtained along a line of exploration on the surface of the earth, the digital samples can be formed into an array (t-x) with each sample in the array representing the amplitude of the seismic signal as a function of time (t) and horizontal distance (x). When such arrays are visually reproduced, by plotting or the like, seismic sections are produced. A seismic section depicts the subsurface layering of a section of the earth. It is the principal tool which the geophysicist studies to determine the nature of the earth's subsurface formation. Before an array of seismic samples or traces can be converted into a seismic section for interpretation by geophysicists, however, the array must be extensively processed to remove coherent noise and make reflection events discernable.

Source-generated coherent noise has received much attention because it can overwhelm the seismic record. This leads to severe deterioration of data quality. Such source-generated noise includes ground roll and air waves in the case of land data, and energy propagating as modes trapped in the water and near-surface layering in the marine case. Also, coherent scattered energy is often observed both in land and marine data. Another type of coherent noise is encountered in marine surveys when two vessels are acquiring seismic data simultaneously in the same general area. A shot from one vessel enters the recording of the other vessel often at oblique angles. In vertical seismic profiling and cross-borehole seismic data, strong coherent noise results from the propagation of tube waves up and down the borehole. In addition, reflected refractions associated with head waves can be a major source of coherent energy and cause severe deterioration of seismic data quality in some areas. Other coherent noise includes multiples and the like.

Probably the most commonly used technique of removing coherent noise from t-x sections is the f-k (frequency-wavenumber) filter. In f-k filtering the t-x data is transformed to the f-k domain. In this domain the coherent noise often occupies a different portion of the f-k domain than the signals and can be easily removed. In U.S. Pat. No. 4,218,765 to Kinkade, seismic traces are transformed to an f-k array and filtering is performed on the traces in the f-k domain. In U.S. Pat. No. 4,380,059 to Ruehle, multiple reflections are filtered from seismograms by transforming them into an f-k array representing amplitude as a function of frequency and wavenumber. In Ruehle, the f-k array of the seismograms is filtered by weighting all samples with the inverse of the f-k transform of the multiple reflections.

While f-k filtering is a very effective means of attenuating coherent noise from seismic traces, it is not the most optimal method in the sense of optimally preserving signal and rejecting noise. Taper zones between the noise and signal in the f-k domain have to be chosen by the geophysicist. If the taper zone is too small sidelobes will appear in the filtered seismic traces. If the taper zone is too large signal may be removed as well as the coherent noise or the coherent noise will not be significantly removed.

Furthermore, multichannel filters such as the f-k filter require uniform spatial sampling. Seismic data acquired on land frequently suffers from non-uniform spatial sampling. This precludes the application of f-k filtering unless trace interpolation is performed. Quite often the data is not sampled close enough in space to prevent aliasing of noise. Attempts to reject aliased noise using the f-k technique forces the resulting output to be highly band-limited, a very undesirable result. Many times aliased noise cannot be removed because it crosses through the signal region in the f-k domain. Also, multichannel filtering techniques are especially sensitive to channel inequalities.

Probably the most undesirable aspect of the f-k filtering is the 'mixing' of the data which is unfortunately inherent in that process, producing an undesirable appearance in the output data. In addition, statics which are present in the data cannot properly be resolved after application of the f-k filter because of the 'mixing'.

It is therefore an object of the present invention to remove coherent noise from an array of seismic traces without distorting the reflection signals in the array.

SUMMARY OF THE INVENTION

In accordance with the present invention, there is provided a method for removing coherent noise from an array of seismic traces.

More particularly, the moveout of a coherent noise across the array of seismic traces is determined. The temporal limits of the noise are used to select a space-time gate containing signal-plus-noise which is extracted from said array of seismic traces. The moveout is then removed to flatten the noise within the gate and produce a gated signal-plus-noise record. Trace-to-trace amplitude and time variations of the flattened noise is removed and multichannel filtering is applied to the gated signal-plus-noise to reject signal and pass noise to produce a noise estimate. A Wiener shaping filter is designed and applied to the noise estimate and the result subtracted from the signal-plus-noise producing a signal estimate. The inverse of the trace-to-trace amplitude variations is applied to each trace of the signal estimate to recover true amplitude on each trace. Thereafter, the signal estimate is moveout restored into the array of seismic traces. The foregoing may be repeated for each differing moveout of coherent noise to be removed from the array of seismic traces.

DESCRIPTION OF THE PREFERRED EMBODIMENT

Figure 1:
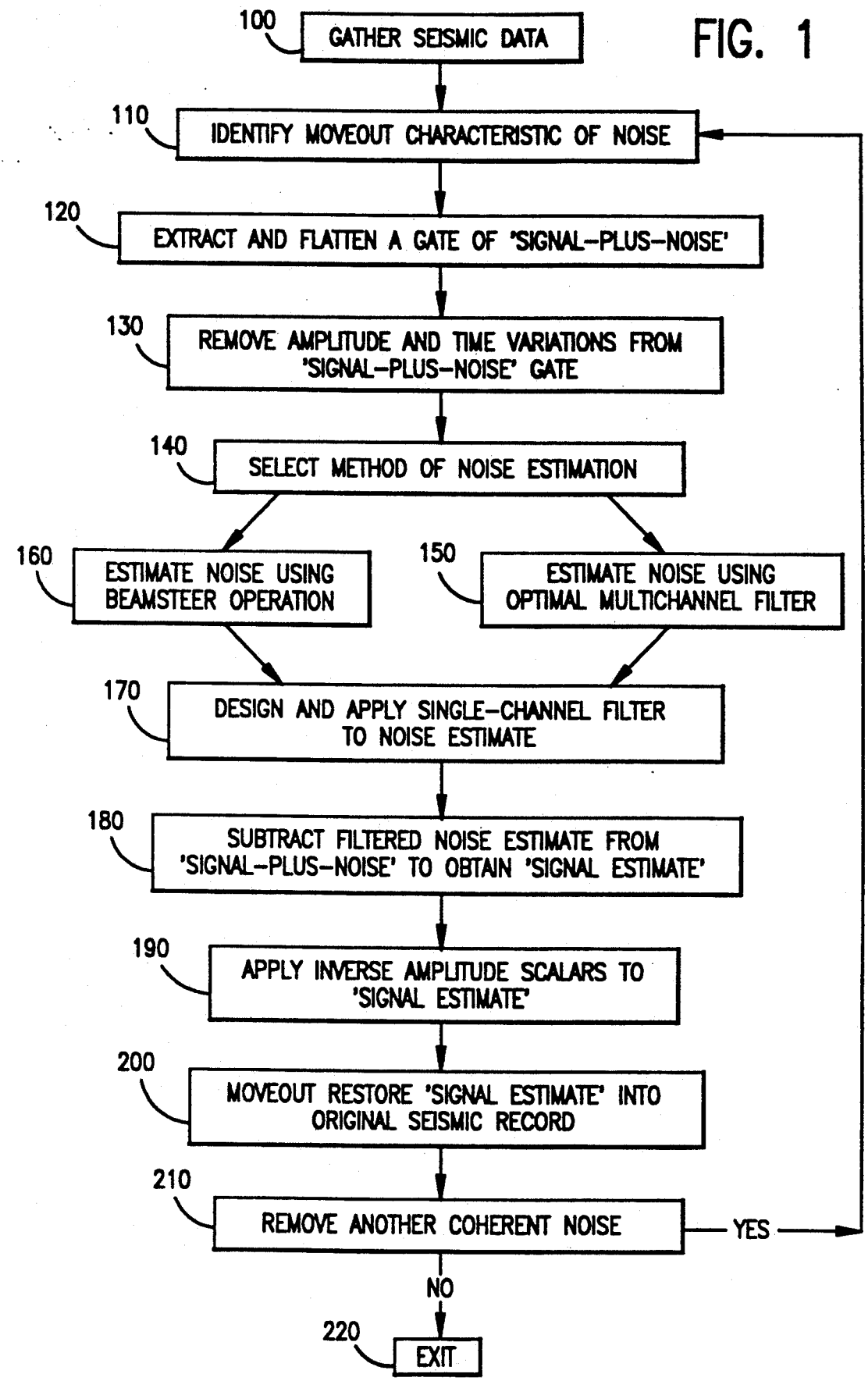
FIG. 1 is a flow chart illustrating the method of the present invention of removing coherent noise from seismic traces.
Figure 2:
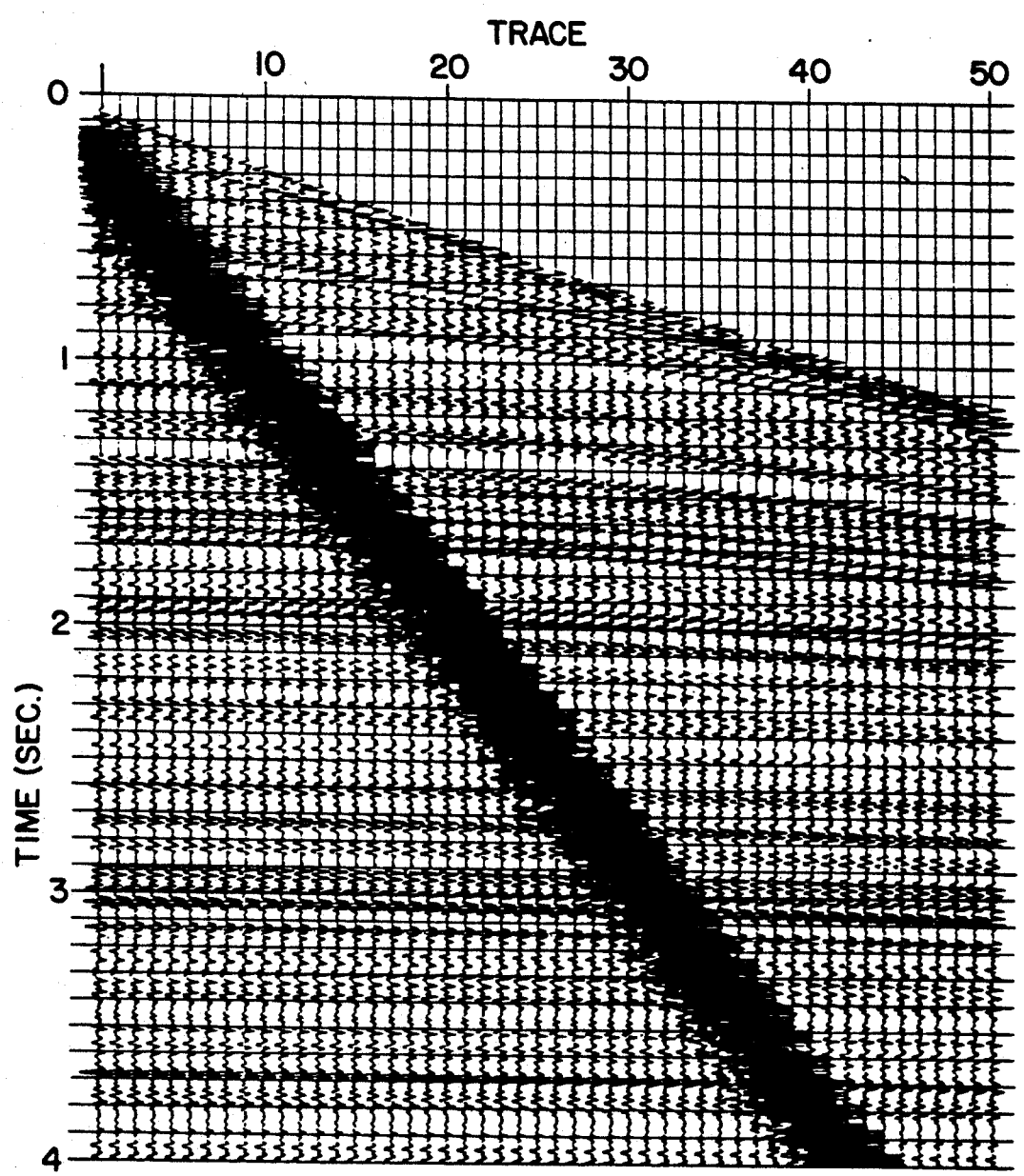
FIG. 2 illustrates an array of seismic traces which is to be processed by the method of the present invention for the removal of coherent noise.

Referring first to FIG. 1 the method of removing coherent noise from a series of seismic traces is described. The method commences at step 100 with the acquisition of seismic data using any one of numerous well-known seismic exploration techniques. For example, an artificial disturbance may be generated along the earth by the use of dynamite or the like. The resulting acoustic waves travel downwardly in the earth and are reflected upward from subsurface reflecting interfaces. The reflected waves are received at geophones or other detectors located along the surface and recorded in reproducible form as seismograms. Often surface waves and air waves travelling from the shot to the geophones are also recorded along with the reflected waves. These waves are considered coherent noise and would have to be removed to observe the reflected waves. An array of seismic traces which would be acquired by a typical seismic survey may be seen by reference to FIG. 2. The seismic traces depicted in FIG. 2 represent the amplitude of seismic reflections as a function of time and distance along a line of exploration in the x direction of the earth's surface. These traces have been gathered into a t-x array commonly referred to as a "seismic record" or "shot record".

Proceeding to step 110 the seismic record is examined to identify unwanted coherent noise and to determine its moveout characteristics across the traces and its temporal limits. The moveout (linear or curved) specifies the beginning time for the window of data containing 'signal-plus-noise' to be extracted from the seismic record. The linear velocity option is convenient to use for many types of noise such as the air wave or ground roll. For example, the velocity (V) of the air wave can be calculated as $V = 1051 + 1.1\ ^*F$, where F is the temperature in Fahrenheit. For linear noise a table of times t(n), defining the initial time to extract the window, w(i,n), from the data, d(j,n), can be computed from the equation $t(n) = n^*X/V$, for $n = 1$ to N, where N is the total number of traces, V is the velocity of the noise, and X is the trace spacing. For curved noise the table t(n) must be defined by the user.

Proceeding to step 120 a space-time gate containing the noise is defined and extracted and the moveout removed to flatten the noise, producing a record of 'signal-plus-noise' in accordance with the following equation:

$$w(i,n) = d(t(n)+i,n) \quad (1)$$

for $i = 1$ to T, where T is the length of the window.

Figure 3:
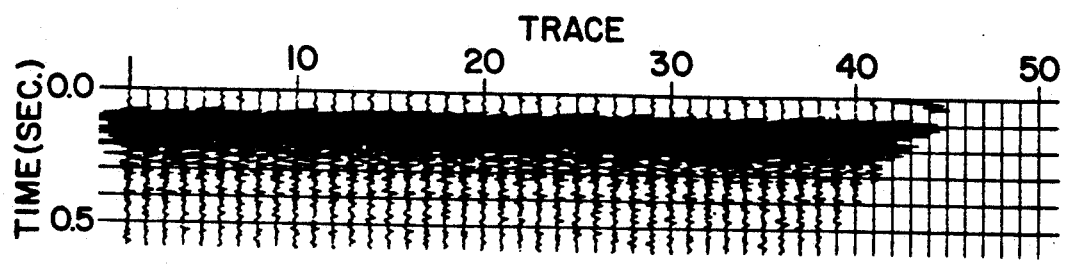
FIGS. 3-5 illustrate the results of intermediate steps in the method of the present invention in removing coherent noise from the array of seismic traces of FIG. 2.

No interpolation is performed at this step. Samples nearest to $t(n)+i$ are taken. The noise now appears to propagate at infinite velocity. FIG. 3 is an example of 'signal-plus-noise'.

At step 130 amplitude and time variations of the flattened noise are removed from the gate of 'signal-plus-noise'. Removing these perturbations from the data optimizes the noise estimation step at 140. It is well known that any fluctuations in amplitude and/or time from trace-to-trace will have an extremely detrimental effect on the performance of a multichannel filter as used in step 140. This effect becomes more pronounced at higher frequencies, thus limiting the filter's ability to pass broadband noise. This optimization step first calculates and applies a scalar to each trace to balance the amplitudes through the following equations:

$$rms(n) = \left(\frac{1}{T} \sum_{i=1}^{T} w(i,n)^2\right)^{\frac{1}{2}} \quad (2)$$

$$W(i,n) = w(i,n)/rms(n). \quad (3)$$

Next, the number of channels, M, to use in the noise estimation step is specified. An odd number (typically 5, 7, 9, 11 or 13) is used. The center trace is the output location for the noise estimate in the multichannel process. For example, when M = 7 the multichannel process will use a center trace and three traces on either side of the center trace to produce the noise estimate at the center location.

The second part of the optimization step calculates and removes trace-to-trace time variations prior to applying the multichannel process. Time variations are removed by computing time differences between traces on either side of a center trace. The time variations are found by finding the maximum crosscorrelation between the traces and the center trace. The crosscorrelation is defined as $$cc(j) = \sum_{i=1}^{T} W(i,n2)^* W(i+j,n1) \quad (4)$$

for $j = -L$ to L, where $2L+1$ is the number of lags in the crosscorrelation unction, n1 is the outside trace and n2 the center trace. The jth lag where the crosscorrelation is the largest is used with the two adjacent lags in a quadratic interpolating polynomial to determine the fractional sample point where the traces are aligned. Interpolation operators are then applied to time align the outside traces with the center trace:

$$W'(i,n) = \sum_{k=0}^{NF-1} F(k,p)^* W(i-k+j,n) \quad (5)$$

where W'(i,n) is the time aligned 'signal-plus-noise' estimate, F(k,p) the least square bandlimited interpolation operators, and NF is the number of filter points in each interpolation operator. Samples are interpolated to the nearest dt/NFT, where NFT is the number of filters and dt is the sample interval. For each fractional sample interval a different pth operator is used, where $p = NFT^*$ (jdt−INT(jdt)). Determination of the interpolation operators is a known art.

At step 140 the method of noise estimation is selected. The method of selection depends upon how close in velocity the noise is to the signal and the speed of execution. If the noise has a velocity close to the velocity of the reflections, the method proceeds to step 150 where a multichannel filter is used to estimate the noise. If the user wants the method to execute quickly and the velocity of the noise is not close to the velocity of the signal, the method proceeds to step 160 where the noise is estimated by a beamsteer operation.

At step 150 multichannel filtering is applied to the 'signal-plus-noise', W'(i,n). One example of such multichannel filtering is described in U.S. Pat. No. 5,067,112 to Meek and Linville, the teaching of which is incorporated herein by reference. Such method of filtering removes coherent noise from seismic traces by first Fourier transforming each trace into the frequency-distance (f-x) domain. For each frequency the data now consists of complex spatial samples. A complex filter operator is then designed to remove a particular wavenumber associated with the noise at each frequency. The complex operator is then convolved with the complex spatial sequence. After all the frequency components have been filtered, the data is transformed back to the time-distance domain by inverse Fourier transforming each trace. In our application of this filter the noise having been flattened appears to propagate at infinite velocity and therefore lies along the wavenumber k TM 0 in the f-k plane. The f-x filter operator is designed to sharply reject energy on the k=0 axis. The noise then will be totally rejected by 'signal-plus-noise' to give an estimate of noise only—the 'noise estimate', N(i,n).

Proceeding to step 160 where the method of calculating the 'noise estimate', N(i,n), using a beamsteer operation is selected. The beamsteer operation estimates a center trace by summing adjacent traces:

$$N(i, n) = \sum_{m=0}^{M-1} W'(i, n + M/2 - m) \quad (6)$$

Figure 4:
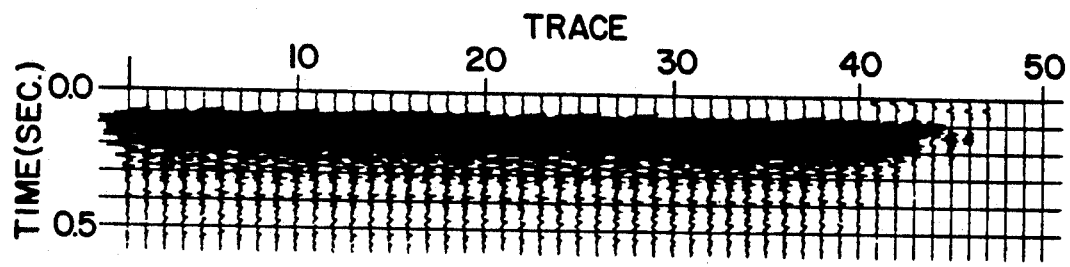

FIG. 4 is an example of the 'noise estimate'.

At step 170 a short (3 to 5 point) single-channel Wiener filter is designed to match the 'noise-estimate' to the noise in the data trace containing 'signal-plus-noise'. This filter is then convolved with the 'noise estimate':

$$N'(i, n) = \sum_{k=0}^{K-1} a(k)*N(i - k, n) \quad (7)$$

where K is the number of filter coefficients.

The single channel Wiener-Levinson filter design technique is described in U.S. Pat. No. 5,051,963 to Linville and Meek, the teaching of which is incorporated herein by reference. In this application the data trace of 'signal-plus-noise' is crosscorrelated with the 'noise estimate' trace, and the 'noise estimate' trace is autocorrelated. These correlation functions provide the required input to the usual process of Wiener-Levinson filter design. A small amount of white noise is added to ensure that the filter design process is stable. The Wiener-Levinson filter design yields a series of filter coefficients. The filter is then convolved with the 'noise estimate' trace. The mathematical effect of this convolution is to precisely align the 'noise estimate' trace with the corrupting noise in the data trace to ensure that the 'noise estimate' and the noise to be removed from the data trace are precisely in phase, and that their amplitudes are equal, so that in the following subtraction step, the noise will be precisely subtracted from the corrupted data trace.

At step 180 the filtered 'noise estimate' is subtracted from the 'signal-plus-noise' traces leaving a signal-only trace—the 'signal estimate':

$$S(i,n) = W'(i,n) - N'(i,n) \quad (8)$$

Figure 5:
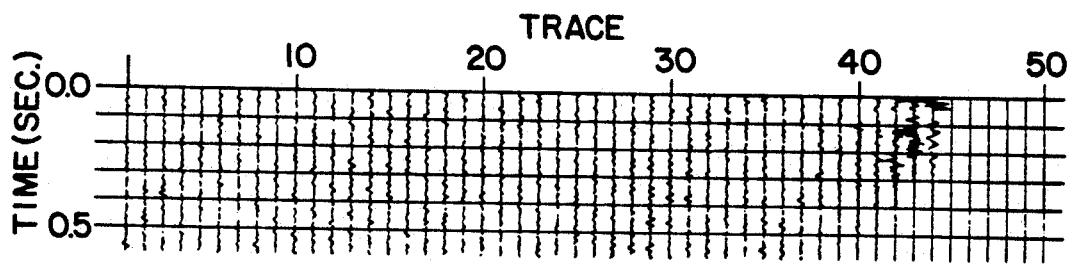

FIG. 5 is an example of the 'signal estimate'.

At step 190 the inverse amplitude scalars, rms(n), are applied to each 'signal estimate' trace to recover true signal amplitude on each trace:

$$S'(i,n) = S(i,n)*rms(n) \quad (9)$$

At step 200 the 'signal estimate', S'(i,n), is moveout restored into the original seismic record to produce a time-distance array of seismic traces free of coherent noise. This step of restoring the 'signal estimate' to the seismic record smoothly ramps the 'signal estimate' gate S of data into the remaining (uncontaminated) portion of the seismic record:

$$d'(t(n)+i,n) = S'(i,n) * taper(i) \quad (10)$$

where taper (i) is an on-off ramp function.

Figure 6:
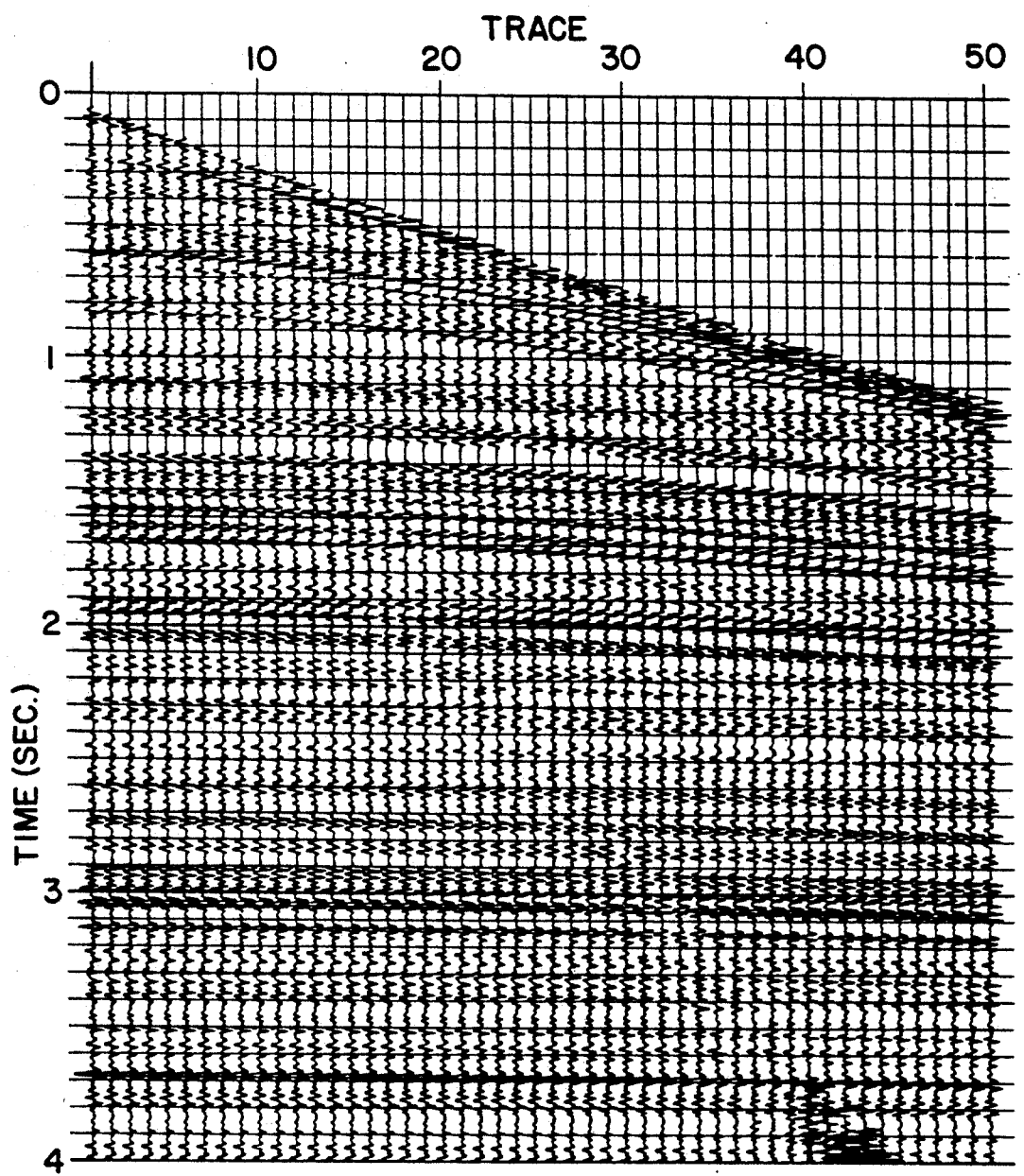
FIG. 6 illustrates an array of seismic traces of FIG. 2 with coherent noise removed by the method of the present invention.

FIG. 6 is an example of application of the method of the present invention to the array of seismic traces in FIG. 2.

At step 210 if noise of another moveout is present, the procedure returns to step 110. Otherwise, the procedure terminates at step 220.

Thus, there has been described and illustrated herein a method for removing coherent noise from seismic data by extracting a gate of 'signal-plus-noise' surrounding the corrupting noise, estimating the noise in the 'signal-plus-noise' gate either through optimal multichannel filtering or a beamsteer operation, determining a 'signal estimate' by subtracting the 'noise estimate' from the 'signal-plus-noise' in the gate, and restoring the 'signal estimate' into the original seismic data record to produce a time-distance array of seismic traces free of coherent noise. However, those skilled in the art will recognize that many modifications and variations besides those specifically set forth may be made in the techniques described herein without departing substantially from the concept of the present invention. Accordingly, it should be clearly understood that the form of the invention described herein is exemplary only, and is not intended as a limitation on the scope of the claims.

We claim:

1. In seismic exploration wherein seismic sources are activated at spaced locatins along a line of exploration and the amplitude of reflections from subsurface formations are recorded as a function of time and distance along said line of exploration to produce a time-distance array of seismic traces, said seismic traces comprised of seismic signals and coherent noise, a method of processing said seismic traces to remove said coherent noise comprising the steps of:
   a) determining the moveout of a coherent noise to be removed from said array of seismic traces,
   b) determining from said moveout a space-time gate containing signal-plus-noise to be extracted from said array of seismic.traces,
   c) extracting the gated signal-plus-noise from said array of seismic traces,
   d) removing moveout to flatten noise within said gate and produce a gated signal-plus-noise record,
   e) removing trace-to-trace amplitude and time variations of said flattened noise from said gated signal-plus-noise record,
   f) filtering said gated signal-plus-noise record with a multichannel filter to reject signal and pass noise to produce a noise estimate, g) matching said noise estimate to said signal-plus-noise record, and subtracting said matched noise estimate from said gated signal-plus-noise record to produce a signal estimate, h) applying the inverse of said trace-to-trace amplitude variations to each trace of the signal estimate to recover true amplitude on each trace, and i) moveout restoring said signal estimate into said array of seismic traces to produce a time-distance array of seismic traces free of said coherent noise.

2. The method of claim 1 wherein the step of determining said space-time gate includes the step of determining temporal limits of said moveout specifying the initial time for a gate of data containing signal-plus-noise to be extracted from said seismic traces.

3. The method of claim 2 wherein for linear noise the initial time for said gate is determined as follows:

$$t(n) = n*X/V \text{ for } n = 1 \text{ to } N$$

where,

N = total number of traces,
V = velocity of the noise, and
X = trace spacing.

4. The method of claim 1 wherein said record of signal-plus-noise for said gate is produced in accordance with the following expression:

$$w(i,n) = d(t(n)+i,n)$$

for i = 1 to T,
where
w = gated signal-plus-noise,
t = initial time of said gate,
T = gate length,
d = data, and
n = trace number.

5. The method of claim 1 wherein said trace-to-trace amplitude variations rms(n) are determined in accordance with the following:

$$rms(n) = \left( 1/T \sum_{i=1}^{T} w(i,n)^2 \right)^{\frac{1}{2}}$$

where
w = gated signal-plus-noise,
n = trace number, and
T = gate length.

6. The method of claim 1 wherein said amplitude variations rms(n) are removed from said gated signal-plus-noise record in accordance with the following:

$$W(i,n) = w(i,n)/rms(n)$$

for i-1 to T,
where
W(i,n) = amplitude balanced signal-plus-noise estimate,
w(i,n) = gated signal-plus-noise estimate, and
rms(n) = amplitude gains.

7. The method of claim 1 wherein said trace-to-trace time variations are determined by finding the maximum crosscorrelation between traces on either side of a center trace in accordance with the following:

$$cc(j) = \sum_{i=1}^{T} W(i, n2)*W(i+j, n1)$$

for J = −L to L,
where
2L+1 = number of lags in the crosscorrelation function,
n1 = outside trace,
n2 = center trace, and by applying interpolation operators to time align the outside traces to the center trace based on the jth lag where crosscorrelation is largest in accordance with the following:

$$W'(i,n) = \sum_{k=0}^{NF-1} F(k,p)*W(i-k+j,n)$$

where
W'(i,n) = time aligned gated signal-plus-noise estimate,
(k,p) = least square bandlimited interpolation operators, and
NF = number of filter points in each interpolation operator.

8. The method of claim 1 wherein said gated signal-plus-noise record is filtered with a multichannel filter to reject signal and pass noise to produce a noise estimate N(i,n) in accordance with the following for beamsteer operation:

$$N(i,n) = \sum_{m=0}^{M-1} W'(i, n + M/2 - m)$$

for I = 1 to T,
where
N(i n) = noise estimate
W'(i,n+M/2−m) = time aligned gated signal-plus-noise,
M = number of channels to sum, and
n = channel number.

9. The method of claim 1 further including the step of matching said noise estimate with the coherent noise in said gated signal-plus-noise record prior to subtracting said noise estimate from said gated signal-plus-noise record in accordance with the following:

$$N'(i,n) = \sum_{k=0}^{k-1} a(k)*N(i-k, n)$$

where
a(k) are the Wiener filter coefficients,
k is the number of filter coefficients,
N(i-k,n) is the noise estimate, and
N'(i,n) is the Wiener filtered noise estimate.

10. The method of claim 1 wherein said noise record is subtracted from said signal-plus-noise record to produce said signal estimate in accordance with the following expression:

$$S(i,n) = W(i,n) - N'(i,n)$$

for i = 1 to T,
where
S(i,n) = signal estimate,
W(i,n) = gated signal-plus-noise estimate, N′(i,n) = Wiener filtered noise estimate,
T = gate length, and
n = trace number.

11. The method of claim 1 wherein said true amplitudes of said signal estimate are recovered in accordance with the following expression:

$$S'(i,n) = S(i,n) * rms(n)$$

for $i \leq 1$ to T,
where
S(i,n) = signal estimate,
S′(i,n) = true amplitude signal estimate,
rms(n) = amplitude gains, and
n = trace number.

12. The method of claim 1 wherein said true amplitude signal estimate is moveout restored in said array of seismic traces in accordance with the following expression:

$$d'(t(n)+i,n) = S'(i,n) * taper(i)$$

for $i = 1$ to T,
where
d′(t(n)+i,n) = seismic record with coherent noise removed,
S′(i,n) = true amplitude signal estimate,
taper (i) = on-off ramp function, and
n = trace number.

13. The method of claim 1 wherein steps (b) through (i) are repeated for each differing moveout of coherent noise determined in step (a).

* * * * *